_United States Patent_ [19]

Litchford

[11] 3,757,324
[45] Sept. 4, 1973

[54] PROXIMITY INDICATION WITH RANGE AND BEARING MEASUREMENTS

[75] Inventor: George Barrett Litchford, Northport, N.Y.

[73] Assignee: Litchstreet Co., Northport, N.Y.

[22] Filed: Sept. 15, 1971

[21] Appl. No.: 180,578

[52] U.S. Cl.... 343/6.5 R, 343/6.5 LC, 343/112 CA
[51] Int. Cl............................................. G01s 9/56
[58] Field of Search.................. 343/6.5 R, 6.5 LC, 343/112 CA, 106 R

[56] References Cited
UNITED STATES PATENTS

| | | | |
|---|---|---|---|
| 3,550,129 | 12/1970 | Steele | 343/112 CA |
| 3,566,404 | 2/1971 | Sorkin | 343/6.5 R |
| 3,167,772 | 1/1965 | Bagnall, Jr. et al. | 343/112 CA |
| 1,135,604 | 4/1915 | Meissner | 343/106 R |
| 3,500,406 | 3/1970 | Parker | 343/6.5 R |

Primary Examiner—Benjamin A. Borchelt
Assistant Examiner—G. E. Montone
Attorney—Henry Huff

[57] ABSTRACT

Proximity indication and evaluation for aircraft, using only the signals emitted by secondary surveillance radar and cooperating transponders, to detect intrusion in a monitored proximity volume and determine slant range and relative bearing to the intruder.

3 Claims, 7 Drawing Figures

PATENTED SEP 4 1973 3,757,324

PROXIMITY INDICATION WITH RANGE AND BEARING MEASUREMENTS

BACKGROUND

1. Field

This invention pertains to radiolocation of mobile vehicles, such as aircraft, with respect to each other within the coverage of a scanning radar at a reference location.

2. Prior Art

Major airports and way points are presently equipped with secondary surveillance radar (SSR) adapted to cooperate with transponder beacons carried on aircraft to discriminate against interference and ground clutter and to provide for transmission of identification and other data such as altitude from the craft to the ground-based radar. A traffic controller observing the radar display directs the pilots of the involved aircraft by radio, usually with voice communication, so as to maintain or restore safe separations between craft. Such systems are limited in capability because each craft must be dealt with individually and requires its share of the controller's time and attention and its share of the available radio spectrum. When traffic is heavy, take-offs and landings are delayed, and the possibility of collisions increases.

The number of mid-air collisions and near misses has become so large in busy areas that numerous inter-aircraft cooperative proximity warning systems have been proposed. Those more prominently under study or development at this time involve frequent or quasi-continuous exchange of signals between all cooperative aircraft within the region of interest and make no provision for non-cooperating aircraft. The required airborne equipment would be bulky and expensive, use more of the already crowded radio spectrum and would be generally independent of other needed and existing equipment, such as transponders. Another drawback of some of the proposed systems is that they provide only relative positional information, without ground reference but in effect with respect to a randomly floating reference.

Common Azimuth copending U.S. patent application Ser. No. 130952, filed Apr. 5, 1971 and entitled Widened common Azimuth Sector Proximity Warning System describes the use of a standard airborne transponder with additional equipment including a receiver for receiving others transponder replies and means for indicating the presence of another transponder-equipped aircraft within a monitored airspace sector or volume.

SUMMARY

According to the present invention, detection of a proximity situation as in the above identified U.S. patent application Ser. No. 130952 is used to add a special proximity code signal to the normal transponder reply. Such a signal, when received from another similarly equipped aircraft, initiates an exchange of interrogations and replies between the respective transponders of a proximity pair, enabling measurement of the direct slant range between the two craft. This operation may be accomplished without modification of the standard SSR-transponder traffic control system, and without interference with its normal operation.

The slant range information, useful in itself as a quantitative measure of the degree of proximity, may also be used in the determination of relative bearings of the two aircraft from each other. To this end, the SSR must be arranged to transmit omnidirectionally a reference signal, called a "North pulse" when the sweeping main radar beam points toward the local magnetic North. North pulse reference signals are available at existing SSR installations, and can be transmitted as required with slight modification of the equipment.

The North pulse, received and decoded by the transponder when the beam points North, and the normal interrogation, received when the beam points at the aircraft, define a time interval which is a measure of the craft's own magnetic bearing from the radar. The own radar bearing, slant range, and the differential range from the radar, which can be determined from the interval between a radar interrogation and the reception of the other's reply to the same interrogation, provide sufficient data for a simple computation of the other's relative bearing.

DRAWINGS

DETAILED DESCRIPTION OF THE PREFERRED EMBODIMENT

Figure 1:
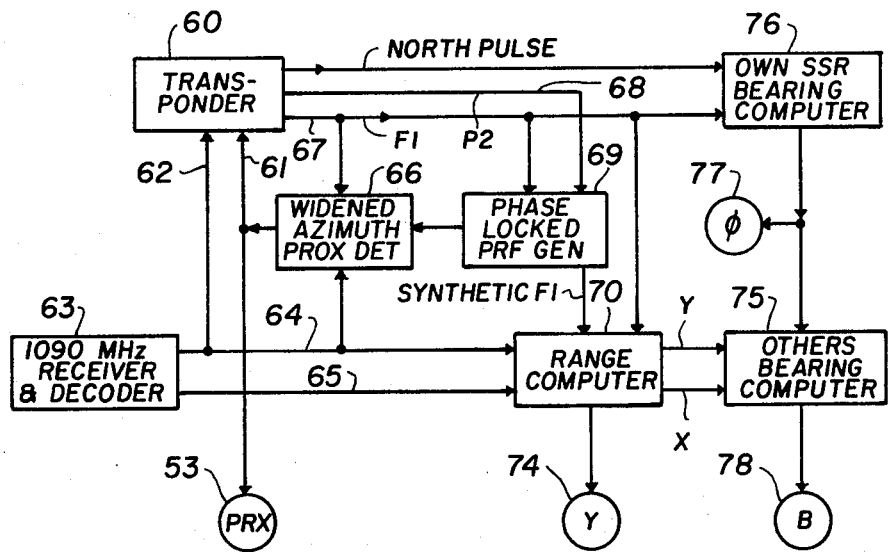
FIG. 1 is a block diagram illustrating generally a preferred embodiment of the invention.

Referring to FIG. 1, a transponder 60 is arranged to receive the usual 1030 MHz interrogations from secondary surveillance radars, and to transmit 1090 MHz replies in response thereto. Many transponders are provided with terminals where the P2 or SLS pulse of the interrogation and the first framing pulse F1 of the reply are available; others may be readily modified for external access to these pulses. A specially coded North reference signal, for example a P0 pulse preceding the standard P1 interrogation pulse while the SSR main beam points North, is made available by slight modification of the transponder decoder, or by addition of a simple special decoder.

All transponders include reply encoders which may be set either manually or by electrical inputs to add any of 4096 coded messages to the reply signal. Some of the available code groups are used to transmit identification, barometric altitude, and various emergency or situation messages; many are not used presently. The transponder 60 is provided with an input line 61 connected to encode a special range command message on the replies when it is energized, for example, in response to the detection of the proximity of another aircraft's transponder. Another input line 62 is connected to a point in the transponder where the reply trigger pulse usually appears. When a pulse is applied to line 62, the transponder is triggered to send a reply in the same manner as if it were interrogated by an SSR, although such interrogation is not received.

A 1090 MHz receiver and decoder 63 is adapted to receive and decode transponder replies of other aircraft in the general vicinity. The decoder portion of this device provides an output pulse on line 64 in response to the reception of both reply frame pulses F1 and F2 from another aircraft's transponder, and an output pulse on line 65 in response to the reception of a range command message.

A widened common azimuth sector proximity detector system 66, which may be the same as that described in the above mentioned copending U.S. patent application Ser. No. 130952, receives the reply frame decode pulse on line 64 and the own transponder F1 pulse and P2 decode pulse on lines 67 and 68. Output from the proximity detector 66 energizes the transponder input line 61 to encode proximity and energizes a proximity indicator 53.

An alternative F1 input to the proximity detector 66 is provided under certain conditions by a phase locked PRF pulse generator 69, which can be synchronized to the pulse repetition frequency of a selected radar either by the repetitive bursts of F1 pulses resulting from interrogations received from that radar, or by the continuous train of decoded P2 pulses received from that radar within the SLS area. The output of the PRF generator 69 is a "synthetic F1" pulse, coincident with the actual F1 pulse when it is present, and substituting for the actual F1 pulse as a time reference when it is absent.

The actual and synthetic F1 pulses are applied to a range computer 70, which also receives as inputs the reply frame decode pulse on line 64 and the proximity decode pulse on line 65. The range computer 70, as will be described in detail with reference to FIG. 3 later, utilizes measurement of the time interval between the F1 and proximity decode pulses, when said pulses are present, to determine the direct slant range Y between the aircraft of a proximity pair. The range computer also utilizes measurement of the interval between synthetic F1 pulses and next following reply frame decode pulses to determine the difference X between the ranges of the two craft from a selected SSR.

Figure 2:
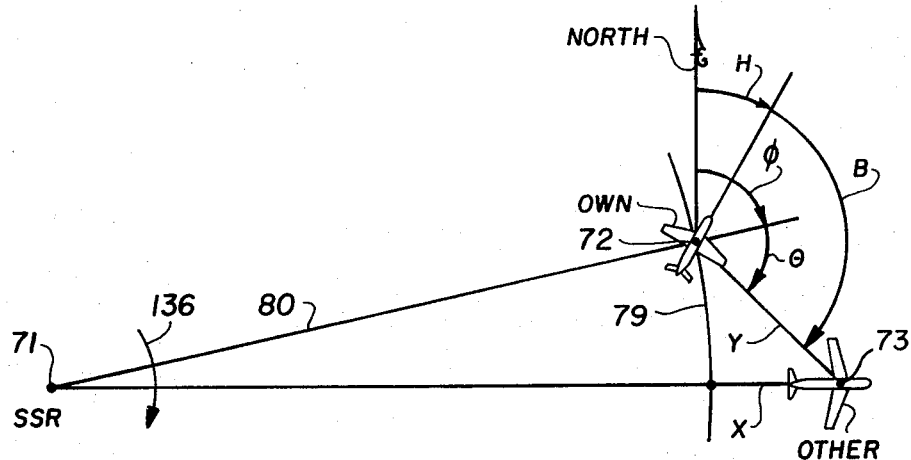
FIG. 2 is a geometrical diagram used in explaining the operation of the apparatus of FIG. 1.

Referring to FIG. 2, the selected SSR is at point 71, the "own" aircraft is at point 72, and the other aircraft is at point 73. The slant range Y is proportional to the time required for a radio signal to travel from one aircraft to the other and back again, less system delays. The differential radar range X is proportional to the time interval between reception of an interrogation from the SSR by the own craft at 72, and reception of the same interrogation by the other craft at 73.

Returning to FIG. 1, the computed slant range Y is displayed by a meter or other quantitative indicator 74. Representations of X and Y are applied to an other's bearing computer 75, which utilizes these and the output of an own SSR bearing computer 76 to determine the bearing of the other craft from one's own craft.

The own SSR bearing computer 76, as will be described further below, utilizes measurements of the time intervals between successive decoded North reference signals, and between North reference signals and next subsequent F1 bursts, to determine own magnetic bearing $\phi$ from the selected SSR. The other's bearing computer 75, also to be described later, determines the angle $\theta$ between one's own line of position from the radar as $\theta = \cos^{-1} X/Y$, adds own SSR bearing $\phi$, and subtracts own magnetic heading H, to determine other's bearing B relative to own's heading. The angular quantities $\phi$ and B are displayed by indicators 77 and 78 respectively.

Referring to FIG. 2, it is seen that the arc 79 closely approximates a straight line perpendicular to the differential radar range line X, and also approximately perpendicular to the own line of position 80. Accordingly the angle $\theta$ is approximately $\cos^{-1} X/Y$, within one or two degrees in a typical situation. As shown in the diagram, $B = \phi + \theta - H$.

The system of FIG. 1 operates at all times in the usual manner of an ordinary SSR beacon transponder, replying to interrogations received during the swell time as the main beam of an SSR sweeps by it. Similar replies from transponders on other aircraft, received and decoded by the 1090 MHz receiver-decoder 63, are ignored unless the other aircraft enters the widened common azimuth sector that is swept by the main beam immediately before or immediately after the "own" aircraft carrying the equipment of FIG. 1. If these replies, as processed in the detector system 66, define a proximity situation, the transponder 60 adds the proximity message to each of its transmissions, thereby alerting the air traffic control system by way of the ground based SSR display.

If the other, or "intruder," aircraft is equipped with a receiver-decoder 63 and a detector system 66, it will also add the proximity message to each of its replies. In the usual case the two aircraft will not approach the proximity condition along a common radial from the SSR. Accordingly, the rotating radar beam will first illuminate only one of the aircraft, then possibly both, if they are near enough to a common radial, then only the other. In the unusual case, when the aircraft approach proximity along a common radial from one SSR, they will nearly always be within operating range of another differently located SSR, and on different radials from that SSR.

When one aircraft is being illuminated by a particular radar beam and the other is not, the one in the beam will be replying with the added proximty message. This message received by the 1090 MHz receiver-decoder on the aircraft which is not then in the radar beam, will trigger the transponder on that aircraft, causing it to transmit a reply, not solicited by a direct SSR interrogation, but by the other aircraft's proximity message. The other aircraft, that is the one presently in the radar beam, will receive the special transmission at a time following its own SSR-solicited transmission by an interval corresponding to the direct slant range Y between the two aircraft. Thus either aircraft, if equipped with a range computer 70, is provided with slant range information updated with each rotation of the radar beam.

The range computer also provides differential SSR range X. Note that both Y and X are available on the equipped aircraft even if the other aircraft does not carry a range computer. Similarly, an aircraft with an own SSR bearing computer 76 and an other's bearing computer 75 will obtain $\phi$ and B angle information from another that carries only the transponder 60, receiver-decoder 63 and detector system 66.

Figure 3:
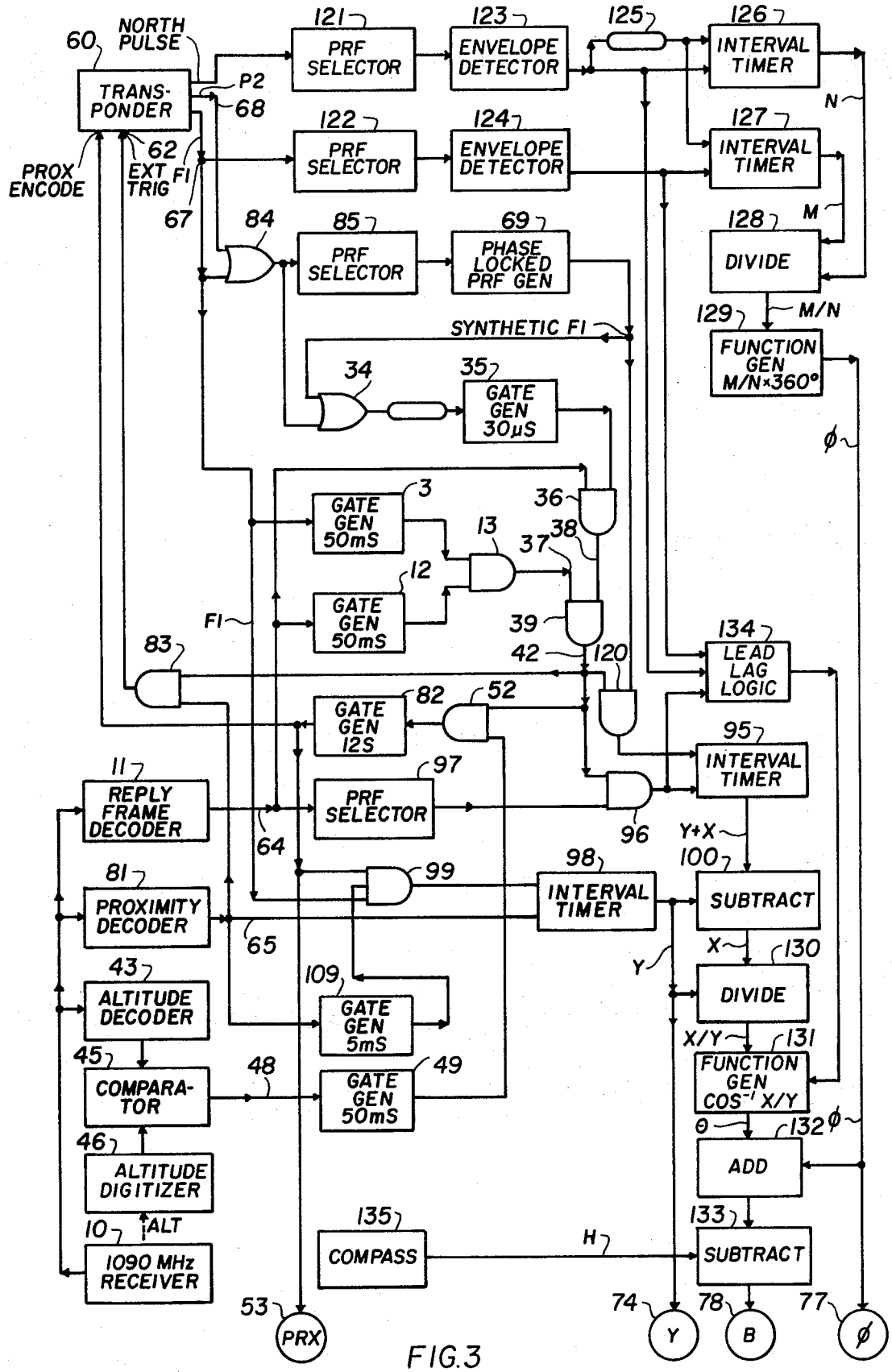
FIG. 3 is a more detailed block diagram showing a specific implementation of the embodiment of FIG. 1.

Referring to FIG. 3, the 1090 MHz receiver-decoder 63 of FIG. 1 includes a 1090 MHz receiver 10, a reply frame decoder 11 and an altitude decoder 43, all of which may be the same as the respective correspondingly designated elements of the system described in said copending U.S. patent application Ser. No.

130952. In addition, a proximity decoder 81 is provided for producing an output pulse whenever a proximity coded reply signal is received by receiver 10.

The widened common azimuth sector proximity detector includes resettable gate signal generators 3, 12, 35 and 49, AND gates 13, 36, 39 and 52, altitude digitizer 46, and comparator 45, all the same as the respective correspondingly designated elements of the system described in said copending U.S. patent application Ser. No. 130952, and interconnected in the same way. The output of AND gate 52 is applied to the start input terminal of a resettable gate signal generator 82 designed for a gate time interval of several SSR beam rotation periods, say 12 seconds. The output of gate generator 82 supplies the proximity encode input 61 to the transponder 60, and energizes the proximity indicator 53.

The common azimuth sector and range warning signal on line 42 at the output of AND gate 39 goes to an AND gate 83, which receives the output of proximity decoder 81 on line 65 as another input. Simultaneous presence of both inputs to AND gate 83 produces an output pulse for the external trigger input 62 of the transponder 60.

Figure 4:
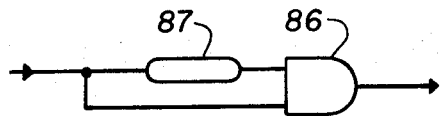
FIG. 4 is a block diagram of a PRF selector suitable for use in the system of FIG. 3.

An OR gate 84 is connected to supply the F1 pulse on line 67 or the decoded P2 pulse on line 68 if either is present, or both if both are present, to the gate generator 35 by way of OR gate 34, and to the phase locked PRF generator 69 by way of a PRF selector 85. The PRF selector consists of an AND gate 86 and a delay device 87 connected as shown in FIG. 4. The delay 87 is made equal to the pulse repetition period, that is, to the interval between successive interrogations of a selected SSR.

Each SSR is assigned a characteristic PRE to distinguish its transmissions from those of others. The delay 87 may be adjusted by the aircraft operator to select the transmissions of a favorably located SSR. Each delayed pulse reaches the AND circuit coincidentally with the next undelayed pulse, producing an output pulse.

Figure 5:
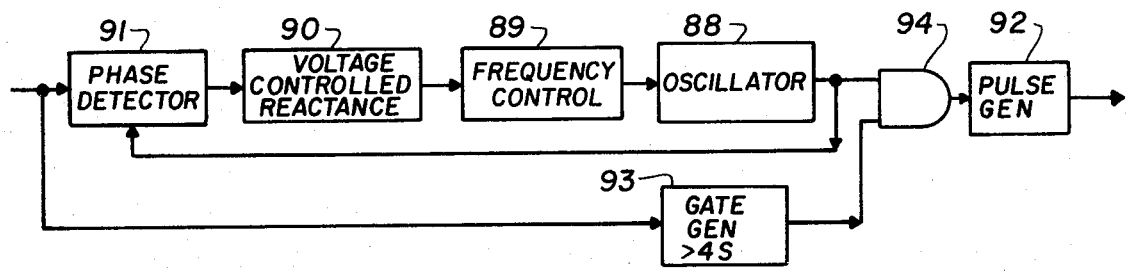
FIG. 5 is a block diagram of a phase locked PRF generator used in the system of FIG. 3.

Referring to FIG. 5, the phase locked PRF generator 69 of FIG. 1 includes an oscillator 88 with frequency control means 89 that can be adjusted, for example by selection of an appropriate crystal, to the desired PRF. A voltage controlled reactance device 90, for example a varactor diode, is coupled to the frequency control 89 to control the phase of the oscillator 88 in known manner. The oscillator output is coupled to a phase detector 91, which also receives the selected F1 or decoded P2 pulses from the PRF selector.

When the aircraft is within the SLS coverage area of the selected radar, decoded P2 pulses are present continuously. Any phase difference between these and the output of oscillator 88 is detected by the phase detector 91, which automatically adjusts the voltage controlled reactance device to null the difference. The oscillator 88 drives a pulse generator 92 to produce a continuous train of pulses, hereinafter referred to as "synthetic F1" pulses, that are phase locked to the selected radar PRF.

When the aircraft is outside the SLS coverage, a burst of about twenty actual F1 pulses occurs during the dwell time of the main beam. These adjust the phase of the oscillator 88 once during each beam rotation. The reactance device 90 is designed in known manner to hold its adjustment between bursts. An AND gate 94, controlled by a resettable gate signal generator 93, couples the oscillator 88 to the pulse generator 92. The gate generator 93 is designed for a gate time interval somewhat longer than one SSR beam rotation, say four seconds. When no F1 or decoded P2 pulses occur within about four seconds after the most recent burst, the AND gate 94 is disabled, disconnecting the oscillator 88 from the pulse generator 92 and stopping it.

Returning to FIG. 3, the synthetic F1 output of the phase locked PRF generator 69, when present, supplies an alternative input by way of OR gate 34 to the range warning gate generator 35. The synthetic F1 also goes through AND gate 120 to the start input terminal of an interval timer 95, which is one of the elements of the range computer 70 of FIG. 1. A second input to gate 120 is taken from the common azimuth sector range warning line 42. The stop input terminal of interval timer 95 receives the output of an AND gate 96, which has one input from the common azimuth and range warning line 42 and another input from the reply frame decoder 11, through a PRF selector 97. This selector, like the selector 85, is adjusted to pass only the repetition frequency of a desired radar.

The range computer also includes another interval timer 98, which receives its start input from an AND gate 99 connected to the F1 line 67 and the proximity signal gate 82, and its stop input from the proximity decoder 81. Gate 99 receives a third input from a 5-millisecond resettable gate generator 109, connected to be started by a proximity decode pulse on line 65. Outputs of the interval timers 95 and 98 are applied to a subtractor 100, and the output of interval timer 98 is displayed on indicator 74.

Figure 6:
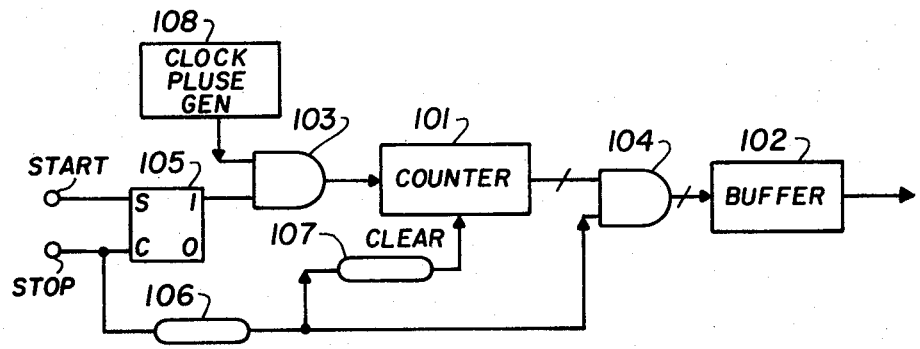
FIG. 6 is a block diagram of an interval timer used in the system of FIG. 3.

Referring now to FIG. 6, the interval timers 95 and 98 may be digital devices each including a counter 101, a buffer 102, AND gates 103 and 104, a control flip-flop 105, and delay devices 106 and 107. A common or system clock pulse generator 108 provides one input to AND gate 103.

A pulse applied to the start input terminal sets the flip flop 105, energizing its "1" output terminal and enabling gate 103 to conduct clock pulses to the counter 101. The counter continues to count until a pulse is applied to the stop input terminal, clearing the flip flop and deenergizing its "1" output to disable the AND gate 103 and stop the counter. The accumulated count at this time represents the length of the time interval between the start and stop input pulses.

After a brief delay in device 106, the stop pulse enables gate 104 to transfer the accumulated count into buffer 102. Gate 104 may be a multiple gate arranged in known manner to effect parallel transfer, or may be a known arrangement for slower, but adequately rapid serial transfer. In either case, the buffer 102 is simply forced into a state representing the count most recently transferred to it, holding that state until forced into another that represents a new, updated count.

Following a further delay in device 107, long enough to complete the transfer, the stop input pulse clears the counter 101. The output of the buffer, which may be either in digital or analog form, represents the most recently measured interval continuously until again updated.

Returning to FIG. 3, the interval timer 98 operates only when a proximity condition has been detected, producing an output from gate generator 82, and proximity messages are being received from another aircraft, producing an output from gate generator 109. These two gate signals enable the AND gate 99 to pass F1 pulses to start the timer 98. Each next following pulse from the proximity decoder 81 stops the timer, which thus measures the interval between the two pulses. This interval, taking system delays into account, is the round trip radio transmit time between the two aircraft, and is therefore a measure of the direct slant range Y.

It should be noted that the described range measuring operation can occur between two suitably equipped aircraft in response to any SSR that illuminates them sequentially. Two or more such radars can cause such ranging without interference, except at the extremely unusual times when both beams point simultaneously into the proximity space. That situation, when it does occur, can persist only temporarily because each radar has a different assigned beam rotation period and pulse repetition period.

The interval timer 95 operates only when a common azimuth sector range warning signal exists on line 42, enabling AND gates 96 and 120, the PRF generator 69 is locked to a selected radar, producing synthetic F1 pulses, and reply frames are being received from another aircraft interrogated by the same selected radar. Under these conditions, the interval timer is started by each synthetic F1 pulse and stopped by each decoded reply frame pulse that passes the PRF selector 97.

The measured interval is that between one's own decoded interrogation or the synthetic F1 and the reception of the other's reply to the corresponding interrogation. This interval, taking system delays into account, is a measure of Y + X, the algebraic sum of the slant range and the differential SSR range. The output of interval timer 95 goes to the subtractor 100, where the difference between it and that of interval timer 98 produces a representation of the differential SSR range X, to be utilized by the other's bearing computer.

Turning to the upper portion of FIG. 3, the own bearing computer 76 of FIG. 1 comprises PRF selectors 121 and 122, envelope detectors 123 and 124, delay device 125, interval timers 126 and 127, divider 128 and function generator 129. The interval timers may be like those described above, but designed for operation on a larger time scale, measuring intervals of up to a radar beam rotation period, say four seconds. Alternatively, they may be simple electromechanical clock devices of known type. The envelope detectors are diode rectifiers with low pass filters, or any other convenient means for converting pulse bursts into single, preferably longer pulses.

In operation, each North pulse from the selected SSR first stops interval timer 126 if it has been running, then after a brief delay in device 125, starts both timers 126 and 127. The next subsequent burst of F1 pulses, occurring as the radar beam sweeps by the aircraft, stops timer 127, which remains stopped until the next North pulse occurs.

The output of timer 126, designated N, represents the length of time required for the radar beam to make a complete revolution. The output of timer 127, designated M, represents the length of time required for the beam to rotate from magnetic North to the line of position of the aircraft from the radar. These outputs are applied to the divider 128, which in turn produces an output representing the quotient M/N.

The quantity M/N has a value between zero and unity representing the magnetic bearing $\phi$ of the aircraft from the SSR as a fraction of a complete circle, i.e. 360°. The representation may be digital or analog, electrical or mechanical, depending upon the specific design of the timers 126 and 127 and the divider 128. The function generator 129 converts this representation to a form suitable for display by indicator 77 and for utilization in the other's bearing computer. It is noted that the computed value of $\phi$ is independent of the individual beam rotation rate of the selected SSR.

The other's bearing computer 75 of FIG. 1, appearing generally in the lower right hand portion of FIG. 3, includes a divider 130, a function generator 131, an algebraic adding device 132, an algebraic subtracting device 133, and a lead-lag logic device 134. The usual magnetic compass 135 provides own heading, H, information for the computation.

Referring to FIG. 2, it is seen that the angle $\theta$ between own SSR line of position 80 and the line from own craft to other craft, measured clockwise from the extension of line 80 past own location 72, is less than 90°. When the other aircraft is closer to the SSR, $\theta$ as thus measured is between 90° and 270°.

The differential SSR range X is considered positive when the other craft is farther from the SSR, and negative when the other is nearer.

This sign convention is automatically taken into account by the normal operation of the interval timer 95 and subtractor 100 of FIG. 3, because the differential transit time measured by the timer 95 is proportional to Y + /X/ when the other craft is farther, and to Y − /X/ when the other is nearer. Thus, when Y is subtracted from Y ± /X/ in the subtractor 100, the difference X is of the appropriate sign.

Again referring to FIG. 2, all SSR beams rotate clockwise as viewed from above, as indicated by the arrow 136. When the own aircraft is illuminated before the other as would occur with the positions shown, the angle $\theta$ is between zero and 180°. When the other craft is illuminated first, $\theta$ lies between 180° and 360°. The first mentioned condition, shown, is called "lead." The other, not shown, is called "lag." Adopting the convention that Y is positive under the lead condition and negative under the lag condition, the sign of Y is determined by the lead-lag logic device 134.

Figure 7:
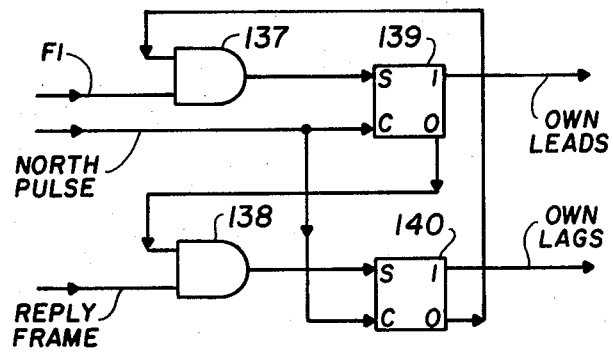
FIG. 7 is a block diagram of a lead-lag logic device used in the system of FIG. 3.

Referring to FIG. 7, the lead-lag logic comprises AND gates 137 and 138, and flip flops 139 and 140. A North pulse signal taken from the output of the envelope detector 123 clears both flip flops, energizing their "0" outputs and enabling both AND gates. Gate 137 is connected to receive detected F1 burst signals from envelope detector 124, and gate 138 is connected to receive decoded reply frame pulses in the output of AND gate 96 of FIG. 3.

After a North pulse signal occurs while the beam of the selected radar is pointing North, an F1 signal will appear while the beam points at the own aircraft and a reply frame signal will appear when the beam points at the other aircraft. When the F1 signal occurs first, flip flop 139 is set, energizing its "1" output terminal to indicate a lead condition, and deenergizing its "0" output terminal. This disables AND gate 138 to prevent a subsequent reply frame signal from setting flip flop 140.

When a reply frame signal occurs before the F1 signal, flip flop 140 sets, energizing its "1" output to indicate a lag condition, and deenergizing its "0" output to prevent setting of flip flop 139 by a subsequent F1 signal. Accordingly, the sign of Y is determined by which of the flip flop "1" outputs is energized.

Returning to FIG. 3, the Y sign information from lead-lag logic device 134 and the output of divider 130, representing the quotient X/Y with the X sign, are applied to the function generator 131, which may be a digital or analog device of known type that produced an output representing the angle $\cos^{-1} X/Y$, including its quadrantal position. This angle is a close approximation, within two or three degrees in a typical situation, of the angle $\theta$.

The adding device combines the representations of $\theta$ and $\phi$ to produce an output representing $\theta + \phi$, which, as shown in FIG. 2, is the magnetic bearing from the own aircraft to the other aircraft. A similar representation of own magnetic heading H, provided by the compass 135, is subtracted in the subtractor 133 to provide an output representing $\theta + \phi - H$, which as seen in FIG. 2, is the other craft's bearing from own craft's heading, B. This representation, exhibited by display device 78, indicates directly the line of sight to an intruder aircraft with respect to the own craft's longitudinal axis.

I claim:

1. The method of determining the relative bearing from one's own location of a first transponder to the location of another transponder within the service area of a selected secondary surveillance radar that omniazimuthally transmits a reference signal as the main radar beam sweeps through a standardized reference direction, such as magnetic North, said method comprising the steps of:
   a. receiving said reference signals,
   b. receiving interrogation signals from said radar as the main beam sweeps by one's own location,
   c. measuring the time interval between successive reception of one of said reference and said interrogation signals and producing a quantitative first representation of the main beam rotation interval,
   d. measuring and producing a quantitative second representation of the time interval between reception of a reference signal and reception of the next subsequently received interrogation signal,
   e. producing a quantitative representation $\phi$ of the quotient of the value said second representation divided by the value of said first representation,
   f. encoding both transponders to transmit a range command signal in reply to received interrogations,
   g. receiving the other's transponders replies at each transponder,
   h. triggering each transponder to trasmit a reply in response to a range command signal received from the other,
   j. measuring and producing a quantitative representation Y of the time interval between each transponder transmission and the reply received in response thereto,
   j. measuring and producing a quantitative representation Y + X of the time interval between one's own reply to an interrogation from said SSR or a simulation thereof and reception of a corresponding reply from the other's transponder,
   k. producing a quantitative representation X of the algebraic difference between Y + X and Y,
   l. producing a quantitative representation $\theta$ of the $\cos^{-1} X/Y$, and
   m. producing a quantitative representation of the algebraic sum of $\phi$ and $\theta$.

2. The method set forth in claim 1, further including the steps of:
   n. producing a quantitative representation H of one's own heading, and
   o. producing a quantitative representation B of the algebraic difference between $\phi + \theta$ and H.

3. Apparatus for determining the slant range Y between an own transponder and another similarly equipped station, comprising:
   a. means for encoding the transponder to transmit a range command signal superimposed on its normal reply format,
   b. means for receiving another's transponder transmissions,
   c. means for triggering the transponder to transmit a reply in response to a range command signal received from another transponder,
   d. means for measuring the time interval between an own transponder transmission and the other's reply received in response thereto,
   e. means for producing a quantitative representation of said measured interval,
   f. means responsive to signals received by the own transponder from a selected secondary surveillance radar to produce a continuous train of synthetic pulses with a substantially constant pulse repetition period, each pulse having a predetermined time relation with respect to one of the own transponder reply pulses when the latter occur,
   g. means for measuring the time interval between a said synthetic pulse and the reception of a corresponding reply from another's transponder to produce a quantitative representation Y + X thereof,
   h. algebraic subtractor means for producing a quantitative representation X of the difference between Y + X and Y,
   i. a divider device for producing a quantitative representation of the quotient X/Y,
   j. a function generator for producing a quantitative representation 0 of the function $\cos^{-1} X/Y$
   k. means for producing a quantitative representation $\phi$ of one's own bearing from the selected secondary surveillance radar,
   l. an adding device for producing a quantitative representation $\phi + \theta$ of the sum of said representations $\phi$ and $\theta$,
   m. compass means for producing a quantitative representation H of one's own heading, and
   n. a subtracting device for producing a quantitative representation B of the algebraic difference between $\phi + 0$ and H.

* * * * *

PO-1050
(5/69)

UNITED STATES PATENT OFFICE
CERTIFICATE OF CORRECTION

Patent No. 3,757,324          Dated September 4, 1973

Inventor(s) George Barrett Litchford

It is certified that error appears in the above-identified patent and that said Letters Patent are hereby corrected as shown below:

Col. 4, line 13, "swell" should be --dwell--; Col. 5, line 35, "PRE" should be --PRF--; Col. 9, line 55, "j." should be --i--.

Signed and sealed this 25th day of December 1973.

(SEAL)
Attest:

EDWARD M. FLETCHER, JR.
Attesting Officer

RENE D. TEGTMEYER
Acting Commissioner of Patents